Figure 1:
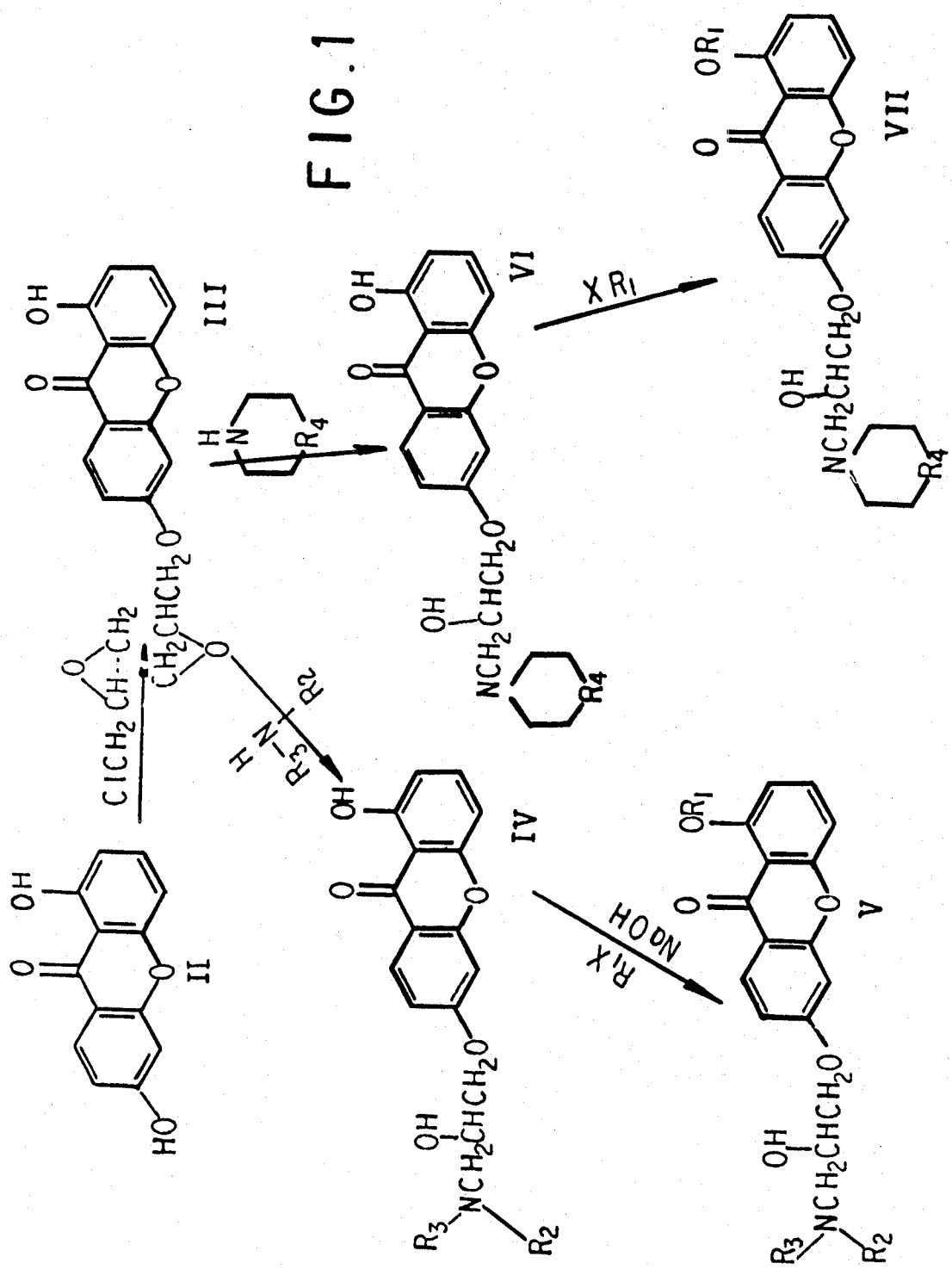

United States Patent

Santilli et al.

[11] 3,912,733
[45] Oct. 14, 1975

[54] 1-SUBSTITUTED-6-(2-HYDROXY-3-SUBSTITUTED AMINOPROPOXY)XANTHEN-9-ONES

[75] Inventors: Arthur A. Santilli, Havertown; Anthony C. Scotese, King of Prussia; Stanley C. Bell, Penn Valley, all of Pa.

[73] Assignee: American Home Products Corporation, New York, N.Y.

[22] Filed: May 8, 1974

[21] Appl. No.: 468,053

[52] U.S. Cl. .......... 260/247.5 H, 260/247.7 S, 260/268 TR; 260/293.58; 260/335; 424/248; 424/250; 424/267; 424/274; 424/283
[51] Int. Cl.² .......... C07D 295/00; C07D 311/86
[58] Field of Search ...... 260/247.5 H, 247.7 S, 335, 260/293.58, 268 TR

[56] References Cited
UNITED STATES PATENTS
3,340,260  9/1967  Howe et al. .......... 260/335

FOREIGN PATENTS OR APPLICATIONS
7,104,599  2/1972  South Africa .......... 260/246 B OTHER PUBLICATIONS
Drake, Journal of Medicinal Chemistry, 1972, Vol. 15, No. 8, pp. 868–869.

Primary Examiner—Robert Gerstl
Assistant Examiner—Richard D. Kelly
Attorney, Agent, or Firm—Joseph Martin Weigman

[57] ABSTRACT

The disclosure is directed to 1-substituted-6-(2-hydroxy-3-substituted aminopropoxy)xanthen-9-ones which have the formula

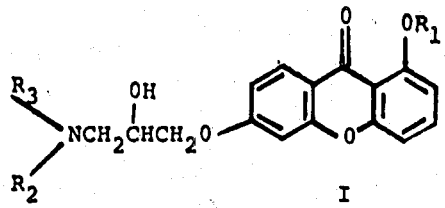

where $R_1$ is hydrogen or di(lower)alkylamino(lower)alkyl; and $R_2$ and $R_3$ when taken separately are hydrogen or lower alkyl and when taken together with the nitrogen atom to which they are attached are morpholino, piperazino, N-lower alkyl-piperazino, piperidino, lower alkylpiperidino and phen(lower)alkyl piperidino.

The compounds exhibit antiarrhythmic activity when evaluated in standard pharmacological procedures or are intermediates in the preparation of compounds having antiarrhythmic activity. Also some of the compounds have anti inflammatory activity.

9 Claims, 1 Drawing Figure

1-SUBSTITUTED -6-(2-HYDROXY-3-SUBSTITUTED AMINOPROPOXY)XANTHEN-9-ONES

This invention relates to new and useful 1,6-bis-substituted xanthen-9-ones and their pharmaceutically acceptable addition salts. The chemical structure of the compounds may be schematically represented by

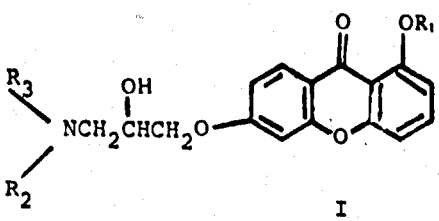

where $R_1$ is hydrogen or di(lower)alkylamino(lower-)alkyl; and $R_2$ and $R_3$ when taken separately are hydrogen or lower alkyl and when taken together with the nitrogen atom to which they are attached are morpholino, piperazino, N-lower alkyl-piperazino, piperidino, lower alkylpiperidino and phen(lower)alkyl piperidino.

The term "lower alkyl" and the like as used herein refers to straight chain and branched chain groups having one to three carbon atoms therein.

Specific embodiments of the invention are 1-hydroxy-6-(2-hydroxy-3-isopropylaminopropoxy)xanthen-9-one, hydrochloride, hemihydrate; 1-(2-diethylaminoethoxy)-6-(3-diethylamino-2-hydroxypropoxy)xanthen-9-one and 1-(2-diethylaminoethoxy)-6-(2-hydroxy-3-morpholinopropoxy)xanthen-9-one.

The preparation of the compounds may be represented schematically by the flow diagram shown in FIG. 1 where $R_1$, $R_2$ and $R_3$ are as described above, and $R_4$ is

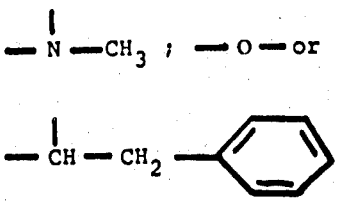

The closest known prior art is U.S. Pat. No. 3,340,266.

The starting material 1,6-dihydroxy-9-oxoxanthene is described in P. K. Grover, G. D. Shah and R. C. Shah, J. Chem. Soc. 3982 (1966).

The compound having formula III of FIG. 1 may be prepared as follows. A mixture of 1,6-dihydroxy-9-oxoxanthene in epichlorohydrin containing a few drops of piperidine is heated at 100° to 128°C for 1 to 3 hours, preferable at reflux for about one and one half hours. The mixture is cooled in ice yielding the product 6-(2-epoxypropoxy)-1-hydroxyxanthene-9-one which is recovered and purified.

Compounds having formula IV of FIG. 1 may be prepared as follows. A mixture of 6-(2-epoxypropoxy)-1-hydroxyxanthen-9-one and lower alkylamine in an inert organic solvent, such as ethanol, is heated at 70° to 90°C for 2 to 4 hours, preferably at reflux for about 3 hours. The solvent is removed, for instance by evaporation. The residue is triturated in an appropriate medium, such as ethyl acetate, and filtered. The filtrate is acidified, for example with alcoholic hydrochloric acid solution, and precipitation induced, if necessary, to yield the product 6-(3-lower alkylamino-2-hydroxypropoxy)-1-hydroxyxanthen-9-one, which is recovered and purified.

Compounds having formula V of FIG. 1 may be prepared as follows. A mixture of 6-(3-lower alkylamino-2-hydroxyproxy)-1-hydroxyxanthen-9-one, halotri(lower)alkylamine and a strong base, such as an aqueous solution of sodium hydroxide, in an inert organic solvent, such as xylene is heated at 120° to 150°C for 4 to 8 hours, preferably at reflux for about 6 hours with the water being removed by azeotropic distillation. The mixture is filtered and the filtrate extracted with a strong acid, such as 10 percent aqueous hydrochloric acid. The water layer is basified, for example with concentrated ammonium hydroxide, and extracted with an organic solvent, such as ether. The organic layer is dried, for example over magnesium sulfate, and removed, for example by evaporation, and crystallized by trituration in an appropriate medium, such as petroleum ether, to yield the product 1-(2-di(lower)alkylamino(lower)alkoxy)-6-(3-lower alkylamino-2-hydroxypropoxy)xanthen-9-one, which is recovered and purified.

Compounds having formula VI of FIG. 1 may be prepared as follows. A mixture of 6-(2-epoxypropoxy)-1-hydroxyxanthen-9-one and morpholine in an inert solvent, such as ethanol, is heated at 70 to 90°C for 2 to 4 hours, preferably at reflux for about 3 hours. The solvent is removed, for example by evaporation, and the residue mixed with a solvent, for example ethyl acetate, and filtered. The filtrate is diluted, for example with petroleum ether and cooled. Precipitation is induced and the precipitate collected and purified to yield a product of formula VI, such as 1-hydroxy-6-(2-hydroxy-3-morpholinopropoxy)xanthen-9-one.

Compounds having formula VII of FIG. 1 may be prepared as follows. A stirred mixture of 1-hydroxy-6-(2-hydroxy-3-morpholinopropoxy)xanthen-9-one), halotri(lower)alkylamine and a strong base, such as an aqueous solution of sodium hydroxide, is heated at 120° to 150°C for 4 to 8 hours, preferably at reflux for about 6 hours, with the water removed by azeotropic distillation. The mixture is filtered and the filtrate extracted with a strong acid, such as ten percent aqueous hydrochloric acid. The water layer is basified, for example with concentrated ammonium hydroxide and extracted with an organic solvent, such as chloroform. The chloroform layer is removed and the residue purified to yield the product 1-[2-di(lower)alkylaminoalkoxy]-6-(2-hydroxy-3-morpholinopropoxy)xanthen-9-one.

In the pharmacological evaluation of the biological activity of the compounds of this invention, the in vivo effects are tested as follows. The heart of an anesthetized dog is exposed by a left thoracotomy. Bipolar electrodes are sutured to the epicardial surface of the left ventricle. The heart is stimulated with square wave pulses of 2–3 milliseconds duration and frequency of 60 hertz for periods of 5 seconds. The voltage is increased until fibrillation ensues. The heart is then defibrillated by DC countershock and the procedure repeated at 10 minute intervals. Drugs are administered intravenously over periods of 3 minutes and fibrillatory threshold examined 10 minutes after start of injection of each dose. Effective antiarrhythmic agents elevate the fibrillatory threshold. Drugs must be soluble in water or in a 50 percent mixture of polyethylene glycol 400 and water to the extent of 5 percent. Useful new antiarrhythmic substances should exert only minimal depressant activity on systemic blood pressure, myocardial contractility and conduction. Standard compounds are quinidine, procainamide, lidocaine, propranolol, diphenylhydantoin.

The compounds of the present invention which are effective antiarrhythmic agents may be administered at a dose of 300 milligrams three or four times per day.

The evaluation of activity as anti-inflammatory and immunosuppressive agents is carried out as follows: Polyarthritis is induced in male Lewis strain rats (150–200 g) by the injection of a suspension of tubercle bacilli in mineral oil in the subplantar tissue of the right hind paw. Drug therapy is either begun on the day of antigen or can be started after appearance of an established arthritic syndrome (14 days). Compounds are administered daily in the form of a fine suspension by stomach tube. Body weights, left and injected right paw volumes and occurence of arthritic nodules on the ears, tail and front paws are determined at frequent intervals over a 14 to 21 day period. All animals are then autopsied and stress organ weights, hematology, histopathology and biochemical studies on blood proteins are done. Active compounds will either prevent or reverse the joint swelling and associated sequella of polyarthritis with minimal toxicity.

Compounds used as standards are Cortisone, phenylbutazone, indomethacin, aspirin, and 6-mercaptopourine. Literature references are: Newbould, B. B. Brit. *J. Pharm. Chemoth.* 21:127, 1963 and Rosenthale, M. E. and Nagra, C. L. *Proc. Soc. exp Biol. and Med.* 125:149, 1967.

When the compounds of this invention are employed as described above, they may be administered alone or in combination with pharmacologically acceptable carriers, the proportion of which is determined by the solubility and chemical nature of the compound, chosen route of administration and standard pharmacological practice. For example, they may be administered orally in the form of tablets or capsules containing such excipients as starch, milk, sugar, certain types of clay and so forth. They may be administered sublingually in the form of troches or lozenges in which the active ingredient is mixed with sugar and corn syrups; and then dehydrated sufficiently to make it suitable for pressing into a solid form. They may be administered orally in the form of solutions which may contain coloring and flavoring agents or they may be injected parenterally, that is intra-muscularly, intraveneously or subcutaneously. For parental administration they may be used in the form of a sterile solution containing other solutes, for example, enough saline or glucose to make the solution isotonic.

The dosage of the present therapeutic agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects.

In order more clearly to disclose the nature of the present invention, specific examples of the practice of the invention are hereinafter given. It should be understood, however, that this is done solely by way of example and is intended neither to delineate the scope of the invention nor limit the ambit of the appended claims. In the examples, all temperatures are stated in degrees Centigrade, and the following abbreviations are used: "g" for grams, "ml" for milliliters, "min" for minutes and "hr" for hours.

EXAMPLE I

This example illustrates the preparation of 6-(2-epoxypropoxy)-1-hydroxyxanthen-9-one, an intermediate having formula III:

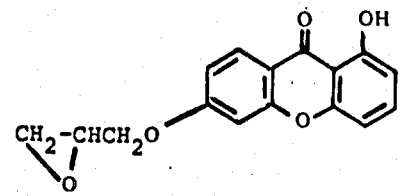

A mixture of 15 g of 1,6-dihydroxy-9-oxoxanthene in 150 ml of epichlorohydrin containing a few drops of piperidine was heated under reflux for 1.5 hours. The mixture on cooling in ice deposited a solid which was collected and dissolved in chloroform. Dilution with petroleum ether resulted in a precipitate having a melting point of 152°–154°.

Anal. Calcd for $C_{16}H_{12}O_5$: C, 67.60; H, 4.26. Found: C, 66.28; H, 4.34.

The product was used without purification to prepare derivatives as described in the following examples.

EXAMPLE II

This example illustrates the preparation of 1-hydroxy-6-(2-hydroxy-3-isopropylaminopropoxy)xanthen-9-one, hydrochloride, hemihydrate a compound of formula IV:

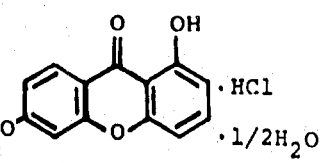

A mixture of 7 g of 6-(2-epoxypropoxy)-1-hydroxyxanthen-9-one and 20 ml of isopropylamine in 100 ml of ethanol was heated under reflux for 3 hours. The ethanol was removed in a rotary evaporator and the residue was triturated with ethyl acetate. After filtering off the insoluble particles, the filtrate was acidified with alcoholic hydrochloric acid solution. Anhydrous ether was added to induce precipitation. The precipitate was collected and recrystallized from ethanol with ether used for inducing precipitation to give 2.4 g of product having a melting point of 255°–260°.

Based on the assumed molecular formula $C_{19}H_{22}ClNO_5 \cdot 1/2H_2O$ it was calculated that the elemental analysis by weight would be 58.69 percent carbon, 5.96 percent hydrogen and 3.60 percent nitrogen. The product was analyzed and found to contain 58.57 percent carbon, 6.05 percent hydrogen and 3.72 percent nitrogen which confirmed with accuracy of the assumed formula. This may be expressed:

Anal. Calcd for $C_{19}H_{22}ClNO_5 \cdot 1/2H_2O$: C, 58.69; H, 5.96; N, 3.60. Found: C, 58.57; H, 6.05; N, 3.72.

The compound when evaluated in the foregoing pharmacological procedure showed a 26 percent protection against acute inflammation at a dose of 25 MPK administered seven times daily for 2 days.

The compound also showed a 28 percent protection against delayed hypersensitivity at a dose of 75 MPK administered seven times daily.

EXAMPLE III

This example illustrates the preparation of 6-(3-diethylamino-2-hydroxypropoxy)-1-hydroxyxanthen-9-one, hydrochloride, a compound of formula IV:

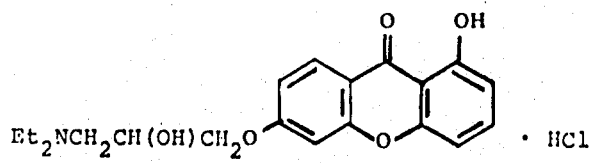

A mixture of 5 g of 6-(2-epoxypropoxy)-1-hydroxyxanthen-9-one and 20 ml of diethylamine in 100 ml of ethanol was heated under reflux for 3.5 hours. The ethanol was removed in a rotary evaporator and the residue triturated with 150 ml of ethyl acetate. The mixture was filtered and the filtrate acidified with alcoholic hydrochloric acid solution. The precipitate was collected and recrystallized from ethanol using ether to induce precipitation to give 3.0 g of product having a melting point of 196-200°.

Anal. Calcd for $C_{20}H_{24}NO_5Cl$: C, 60.99; H, 6.14; N, 3.55; Cl, 9.00. Found: C, 61.02; H, 6.18; N, 3.65; Cl, 8.94.

The compound was found to produce a 97 percent kill of *Trichomonas vaginalis* strain ATCC No. 13972 at a dose of 1 milligram per milliliter.

EXAMPLE IV

This example illustrates the preparation of 1-hydroxy-6-[2-hydroxy-3-(4-methyl-1-piperazinyl)propoxy]xanthen-9-one, dihydrochloride, hydrate, a compound of formula IV:

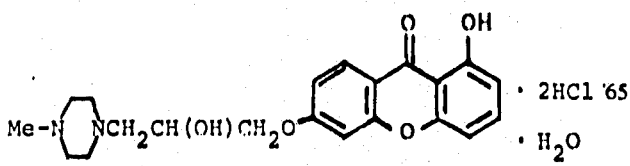

To a suspension of 7 g of 6-(2-epoxypropoxy)-1-hydroxyxanthen-9-one in 100 ml of ethanol was added 20 ml of N-methylpiperazine. The mixture was refluxed for 3 hours. The ethanol was evaporated in a rotary evaporator and the residue was triturated with 150 ml of ethyl acetate. After filtering off the insoluble material, the filtrate was acidified with ethereal hydrochloric acid solution and cooled in ice. The precipitate thus formed was collected and recrystallized twice from ethyl acetate to afford 2.8 g of product which decomposed at 262-266°.

Anal. Calcd for $C_{21}H_{28}N_2O_6Cl_2$: C, 53.06; H, 5.94; N, 5.89. Found: C, 53.04; H, 5.90; N, 5.83.

EXAMPLE V

This example illustrates the preparation of 6-[3-(4-benzylpiperidino)-2-hydroxypropoxy]-1-hydroxyxanthen-9-one, a compound of formula IV:

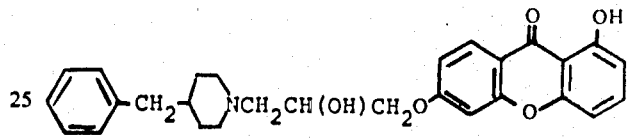

To a suspension of 10 g of 6-(2-epoxypropoxy)-1-hydroxyxanthen-9-one in 250 ml of ethanol was added 20 ml of 4-benzylpiperidine. The mixture was heated under reflux for 3 hours. The mixture was filtered and the filtrate cooled in ice. The precipitate thus formed was collected and recrystallized from ethyl acetate to give 4.8 g of product having a melting point of 146°-149°.

Anal. Calcd for $C_{28}H_{29}NO_5$: C, 73.18; H, 6.36; N, 3.05. Found: C, 73.05; H, 6.45; N, 3.04.

When evaluated in the foregoing pharmacological procedure the compound was found to produce a slight increase in fibrillatory threshold at a dose of 20 MPK.

The compound also showed 26 percent protection against acute inflammation at a dose of 75 MPK administered seven times daily.

EXAMPLE VI

This example illustrates the preparation of 1-(2-diethylaminoethoxy)-6-(3-diethylamino-2-hydroxypropoxy)xanthen-9-one, a compound of formula V:

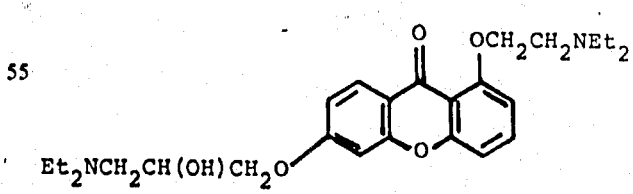

A mixture of 6.4 g of 6-(3-diethylamino-2-hydroxypropoxy)-1-hydroxyxanthen-9-one, 3.1 g of 2-chlorotriethylamine hydrochloride and 2.9 g of 50 percent sodium hydroxide in 500 ml of xylene was heated under reflux for 6 hours with the water being removed by azeotropic distillation. The reaction mixture was filtered and the filtrate extracted with 300 ml of 10 percent aqueous hydrochloric acid solution. The water layer was basified to pH 9 with concentrated ammonium hydroxide and extracted with ether. The ether layer after drying over magnesium sulfate was removed in a rotary evaporator and the residue crystallized by trituration with petroleum ether. This solid was collected and recrystallized from heptane after treatment with charcoal to give 3.7 g of product having a melting point of 94°–96°.

Anal. Calcd for $C_{20}H_{30}N_2O_5$: C, 68.39; H, 7.95; N, 6.14. Found: C, 68.59; H, 7.78; N, 6.20.

Following the foregoing procedure but substituting an appropriate halotri (lower)alkylamine the corresponding 1-dimethylaminomethoxy and 1-(3-dipropylaminopropoxy) derivatives may be prepared.

When evaluated in the foregoing pharmacological procedure the compound was found to produce a slight increase in fibrillatory threshold of all hosts and a large increase in one third of the hosts at a dose of 20 MPK.

When evaluated in the foregoing pharmacological procedure the compound showed, at a dose of 100 MPK administered five times daily, 41 percent protection against acute inflammation and 38 percent protection against delayed inflammation and 56 percent protection against delayed hypersensitivity.

EXAMPLE VII

This example illustrates the preparation of 1-(2-diethylaminoethoxy)-6-(2-hydroxy-3-isopropylaminopropoxy)xanthen-9-one, dihydrochloride, hemihydrate, a compound of formula V:

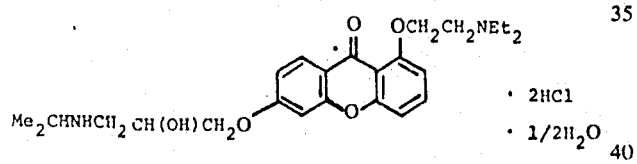

A stirred mixture of 10.3 g of 1-hydroxy-6-(2-hydroxy-3-isopropylaminopropoxy)xanthen-9-one, 5.16 g of 2-chlorotriethylamine and 4.8 g of 50 percent sodium hydroxide was heated under reflux in 500 ml of xylene for 6 hours with the water being removed by azeotropic distillation. The mixture was filtered and the filtrate extracted with 300 ml of 10 percent aqueous hydrochloric acid solution. The water layer after basification with concentrated ammonium hydroxide was extracted with 200 ml of ether. The ether layer was dried over magnesium sulfate, filtered and acidified with ethereal hydrochloric acid. The precipitate was collected, dried and recrystallized from ethanol with petroleum ether used for precipitation affording 4.7 g of product which decomposed at 243°–246°.

Anal. Calcd for $C_{25}H_{36}N_2Cl_2O_5 \cdot 1/2H_2O$: C, 57.25; H, 7.11; N, 5.34. Found: C, 57.15; H, 7.12; N, 5.40.

When evaluated in the foregoing pharmacological procedure the compound was found to produce a marked increase in the fibrillatory threshold of the host at a dose of 20 MPK.

The compound was found to produce a 97 percent kill of *Trichomonas vaginalis* strain ATCC No. 13972 at a dose of 1 milligram per milliliter.

EXAMPLE VIII

This example illustrates the preparation of 1-hydroxy-6-(2-hydroxy-3-morpholinopropoxy)xanthen-9-one, a compound of formula VI:

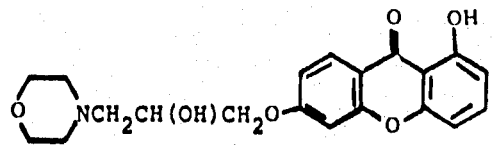

A mixture of 10 g of 6-(2-epoxypropoxy)-1-hydroxyxanthen-9-one and 15 ml of morpholine in 200 ml of ethanol was heated under reflux for 3 hours. The ethanol was removed in a rotary evaporator and the residue was treated with ethyl acetate and filtered. The filtrate after dilution with petroleum ether was cooled in ice. The oil which separated crystallized on scratching. Collection of the solid and recrystallization of the filter cake resulted in 8 g of product having a melting point of 128-131°.

Anal. Calcd for $C_{20}H_{21}NO_6$: C, 64.68; H, 5.70; N, 3.77. Found: C, 64.21; H, 5.73; N, 3.41

EXAMPLE IX

This example illustrates the preparation of 1-(2-diethylaminoethoxy)-6-(2-hydroxy-3-morpholinopropoxy)xanthen-9-one, a compound of formula VII:

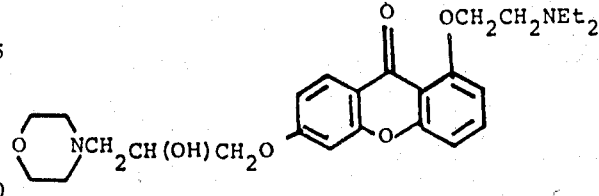

A stirred mixture of 8.1 g of 1-hydroxy-6-(2-hydroxy-3-morpholinopropoxy)xanthen-9-one, 3.4 g of 2-chlorotriethylamine hydrochloride and 3.2 g of 50 percent sodium hydroxide was heated under reflux in 500 ml of xylene for 6 hours with the water being removed by azeotropic distillation. The mixture was filtered and the filtrate extracted with 300 ml of 10 percent aqueous hydrochloric acid. The water layer was basified with concentrated ammonium hydroxide and extracted with 200 ml of chloroform. The chloroform layer was dried over magnesium sulfate, filtered and evaporated in a rotary evaporator. The residue was recrystallized from ethyl acetate to give 3.0 g of product having a melting point of 120-122°.

Anal. Calcd for $C_{26}H_{34}N_2O_6$: C, 66.36; H, 7.28; N, 5.95. Found: C, 66.25; H, 7.09; N, 5.77.

Following the foregoing procedure but substituting an appropriate halotri(lower)alkylamine the corresponding 1-dimethylaminomethoxy and 1-(3-dipropylaminopropoxy) derivatives may be prepared.

When evaluated in the foregoing pharmacological procedure the compound was found to produce a borderline increase in threshold hypertension at a dose of 20 MPK.

The compound showed 41 percent protection against acute inflammation at a dose of 75 MPK administered five times daily and a 38 percent protection against delayed inflammation at a dose of 75 MPK administered five times daily.

What is claimed is:

1. A compound selected from those having the formula

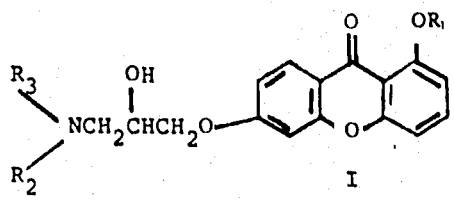

where $R_1$ is hydrogen or lower alkylamino(lower)alkyl; and
$R_2$ and $R_3$ when taken separately are hydrogen or lower alkyl and when taken together with the nitrogen atom to which they are attached are morpholino, piperazino, N-lower alkyl-piperazino, piperidino, lower alkylpiperidino and phen(lower)alkyl piperidino, and their pharmaceutically acceptable addition salt.

2. A compound as defined in claim 1 which is 1-hydroxy-6-(2-hydroxy-3-isopropylaminopropoxy)xanthen-9-one, hydrochloride, hemihydrate.

3. A compound as defined in claim 1 which is 6-(3-diethylamino-2-hydroxypropoxy)-1-hydroxyxanthen-9-one, hydrochloride.

4. A compound as defined in claim 1 which is 1-hydroxy-6-[2-hydroxy-3-(4-methyl-1-piperazinyl)propoxy]xanthen-9-one, dihydrochloride, hydrate.

5. A compound as defined in claim 1 which is 6-[3-(4-benzylpiperidino)-2-hydroxypropoxy]-1-hydroxyxanthen-9-one.

6. A compound as defined in claim 1 which is 1-(2-diethylaminoethoxy)-6-(3-diethylamino-2-hydroxypropoxy)xanthen-9-one.

7. A compound as defined in claim 1 which is 1-(2-diethylaminoethoxy)-6-(2-hydroxy-3-isopropylaminopropoxy)xanthen-9-one, dihydrochloride, hemihydrate.

8. A compound as defined in claim 1 which is 1-(2-diethylaminoethoxy)-6-(2-hydroxy-3-morpholinopropoxy)xanthen-9-one.

9. A compound as defined in claim 1 which is 1-hydroxy-6-(2-hydroxy-3-morpholinopropoxy)xanthen-9-one.